United States Patent Office 3,239,363
Patented Mar. 8, 1966

3,239,363
ESTERS OF ISOMERIC DICARBOXY-NAPHTHALENES
David N. Burdge, Littleton, Colo., assignor to Marathon Oil Company, Findlay, Ohio, a corporation of Ohio
No Drawing. Filed Oct. 5, 1962, Ser. No. 228,753
9 Claims. (Cl. 106—316)

This invention relates to plasticizers and particularly is directed to esters and mixed esters of mixed dicarboxynaphthalene compositions which are effective plasticizers for polyvinyl chlorides and other synthetic plastics.

The compounds of this invention are esters of mixed dicarboxynaphthalenes and mixed esters of mixed dicarboxynaphthalenes and include dialkyl esters containing from 1 to 18 carbon atoms of mixed isomeric dicarboxynaphthalenes such as the 2,3-, 1,6-, 2,7-, etc., isomers of dicarboxynaphthalenes which are derived from petroleum. The mixed dicarboxynaphthalenes of the invention are normally derived from processed petroleum streams rather than from virgin streams and, by a careful distillation cut of the stream, a mixture containing the majority of the dimethylnaphthalenes in the stream is recovered.

The esters of the mixed isomeric dicarboxynaphthalenes are superior plasticizers, having lower migration rates from those plastics which are subject to contact with various solvents. This migration of the plasticizer from a plastic material to a contacting solvent is a particular problem in manufacturing industries, for example, where plastic masks are used in various spraying operations. Currently, such masks, of various plastic composition, can only be used a few times as the plasticizer migrates from the plastic mask and it loses suppleness and compliability. The greatly reduced migration rates of applicant's plasticizers substantially increases the life of such masks, especially masks made of polyvinyl chloride.

In one embodiment of the invention a light catalytic cycle oil is subjected to a careful distillation to recover the fraction having the dimethylnaphthalenes (in the range of 490–525° F). This fraction containing the dimethylnaphthalenes is then subjected to a selective solvent extraction to recover the aromatics from the paraffins and other compounds in that boiling range. The aromatics recovered from the solvent extraction are then oxidized, as by a dichromate oxidation, to produce a mixture of dicarboxynaphthalenes. The esters of the acids may be made by three methods which include: first converting the acids to the acid chloride and then reacting the acid chloride with the desired alcohol in the presence of a base; secondly by direct esterification of acids; and thirdly by esterification of the anhydride to form monoester and then additional esterification of the remaining free acid. The third method permits the formation of mixed ester groups as by esterifying one carboxyl group of each isomeric dicarboxynaphthalene with one alcohol and then esterifying the second carboxy group with a different alcohol.

Naphthalene is a fused aromatic system with eight positions for ring substitution. The 1 and 2 positions are also called the alpha and beta positions. For a dicarboxylic acid derivative of naphthalene there are ten positional isomers. The 490–525° F. cut of a light catalytic cycle oil contains most of the possible dimethyl isomers of naphthalene; however, it is predominantly the 1,6-, 2,6-, 2,7- and the 2,3-isomers.

In the specific form of the invention, a light catalytic cycle oil from a refinery is distilled into cuts corresponding to the boiling points of monomethylnaphthalenes, dimethylnaphthalenes and higher boiling point materials. The dimethylnaphthalene fraction was taken as a cut from 490–525° F. This fraction is then extracted with dimethylformamide in accordance with normal procedure to recover the aromatics from the remainder of the materials, the recovered aromatic fraction being mainly dimethylnaphthalenes. These dimethylnaphthalenes are then oxidized to dicarboxynaphthalenes, which are then esterified to produce mixed dicarboxynaphthalene esters essentially free of other materials.

Included among the objects and advantages of the present invention is the production of esters of mixed isomeric dicarboxynaphthalenes. The process provides means for recovering a mixture of isomeric dimethylnaphthalenes from petroleum streams, and producing esters of the mixed dicarboxynaphthalenes which are valuable plasticizers, particularly for polyvinyl chlorides. Means are provided for making mixed esters of isomeric dicarboxynaphthalenes. The process of the invention provides valuable products efficiently and economically.

These and other objects and advantages of the invention may be ascertained from the following examples which are intended as illustrative only.

EXAMPLE 1

*Preparation of the 2-ethylhexanol ester of mixed dicarboxynaphthalenes*

About 400 grams of an aromatic extract obtained from a distillation cut of a light catalytic cycle oil in the 490–525° F. range were oxidized with sodium dichromate in a pressure reactor at a temperature of under 275° C. At the end of the reaction time, which took a little over an hour, the reaction mixture was removed from the reactor, filtered, and acidified to change the sodium salt into a mixture of dicarboxylic acids. Other methods of oxidation of the mixed acids are, of course, possible and such methods are known.

To the 400 grams of the mixed acids is added about 700 grams of 2-ethyl-1-hexanol, about 500 ml. of toluene and about 20 grams of concentrated sulfuric acid. The mixture was stirred and heated to refluxing during which time water which formed during the reaction was withdrawn and the amount recovered was about 72.0 grams.

At the end of the reaction period the mixture was cooled, washed with water having about 5% of a base (caustic soda) until the reaction mixture was basic, and it was then washed with water until neutral. The mixture was dried over anhydrous magnesium sulfate, after which the dried mixture was distilled to remove the excess alcohol and the toluene. The distillation for the alcohol and toluene was continued to a pot temperature of 200° C. Following the removal of alcohol and toluene the residue was vacuum distilled, giving a main cut in the range of 200–230° C. at 0.09 mm. The product recovery was about 467 grams having a refractive index of $n_D^{24}$ 1.5224.

EXAMPLE 2

Following the procedure of Example 1, about 450 grams of mixed acids (recovered from the light cycle catalytic oil) were mixed with about 500 grams of isopentyl alcohol, about 300 ml. of toluene and about 20 grams of concentrated sulfuric acid. The mixture was refluxed with removal of the water which was formed in the reaction until about 75 ml. of water was recovered. The reaction mixture was then cooled, washed with a 5% base solution until basic, and then washed with water until neutral. The excess alcohol and toluene were removed by distillation, and on vacuum distillation of the residue the following cuts were produced:

Cut 1—B.P. 135–180° C. at 0.09 mm., about 72 grams, $n_D^{24}$ 1.5565

Cut 2—B.P. 180–200° C. at 0.09 mm., yielding about 457 grams at $n_D^{23.5}$ 1.5443

Cut 3—B.P. over 200° C. yielding about 67 grams.

Cut No. 1 includes the monoesters, cut No. 2 the di-esters, and cut No. 3 the tri-esters.

By following the examples above, other di-esters of the mixed aromatic acids may be produced, and among the esters are the dimethyl, diethyl, di-n-propyl, di-i-propyl, di-n-butyl, di-n-pentyl, di-n-hexyl, di-n-heptyl, di-n-octyl, di-n-nonyl, di-n-decyl, di-n-undecyl, di-n-dodecyl, di-n-tetradecyl, di-n-pentadecyl, di-n-hexadecyl, di-isopentyl and various other straight and branched chain alkyl di-esters having from 1 to 18 carbon atoms.

The esters of the naphthalenedicarboxylic acids are thermally unstable at temperatures greater than about 275° C., but even during thermal decomposition the vapor pressure is still quite low. The di-esters are free from odor and taste and in general are light colored compounds.

The di-esters of the mixed isomeric dicarboxynaphthalenes are excellent plasticizers, and particularly plasticizers for polyvinyl chloride. The esters are generally mixed in about 2 parts of the plastic monomer to 1 part of the ester along with very minor parts of stabilizers.

A series of dialkyl esters of naphthalene dicarboxylic acid derived from dimethylnaphthalenes were tested with polyvinylchloride for the following evaluations:

(1) Tensile strength, 100% modulus and elongation, ASTM D-638
(2) Activated carbon volatility, ASTM D-1203
(3) Clash and Berg flexibility test, ASTM D-1043
(5) Oil immersion, 24 hours, ASTM D-543
(5) Water immersion, 24 hours, ASTM D-570
(6) Shore "A" hardness
(7) Loop exudation and sunlight migration The general formula used for mixing with the polyvinylchloride is as follows:

| | Parts by weight |
|---|---|
| Polyvinylchloride | 100 |
| Plasticizer | 50 |
| Ba-Cd stabilizer | 1.5 |
| Stearic acid lubricant | 0.5 |

For blending, the solid ingredients were placed in a mixing bowl and mixed for five minutes. The liquid ingredients were added slowly and the total mixture was stirred for an additional 15 minutes. This blend was then placed in a two-row mill having the rolls heated to 300–315° F. The compositions were milled for a period of about 5 minutes after banding to the rolls. The compositions were then sheeted off the mill in 20 and 45 mil. sheets, and cooled to room temperature. The sheets for the physical tests were molded in a hydraulic press heated to 300° F.

The tests enumerated above were performed as follows:

For the loop exudation and sunlight migration, specimens of a size of 3" x 1" x 0.045" were bent into a loop and stapled to a piece of cardboard. The samples were allowed to remain at room temperature and after four weeks, the samples were examined for tack or liquid exudation on the inside surface of the loop. Additional specimens of the size of 3" x 1" x 0.045" were suspended about 2" from the inside surface of a window where they were exposed to some light for a period of about 4 weeks. The samples were afterwards examined for surface tack or liquid exudation. This test also showed the compatibility of the materials as sole plasticizers for the polyvinylchloride.

The tensile strength, 100% modulus and elongation were determined according to ASTM D-638, using 1/8" dumbbells from 0.075" thickness specimens.

The Clash and Berg flex test was made with 0.075" specimens according to the test procedure set forth in ASTM D-1043. The oil immersion was made by immersing 2" discs of 0.075 mil. thickness in a white petroleum oil at room temperature for about 24 hours according to ASTM Test procedure D-543. The water immersion was conducted using 2 inch discs of 0.075" mil. material in room temperature water for 24 hours according to the Test procedure D-570. The Shore "A" hardness was determined on a Shore "A" hardness instrument and the reading was taken after 15 seconds' application of the point to the surface of the plastic.

The results are tabulated in the table below:

| Sample No. | Plasticizer Sample | Tensile (p.s.i.), ASTM D-638 | 100% Modulus (p.s.i.), ASTM D-638 | Elongation (percent), ASTM D-638 | Volatility (percent), ASTM D-1203 | Flex Test (° C.), ASTM D-1043 | Oil Immersion (percent), ASTM D-543 | Water Immersion (percent), ASTM D-570 | Shore "A" Hardness, 15-sec. reading | Loop Exudation (4 wks.) Nil | Window Exudation (4 wks.) Nil |
|---|---|---|---|---|---|---|---|---|---|---|---|
| 1 | Diisopentyl-2,3-NDC [1] | 2,930 | 2,210 | 217 | 1.1 | +7.5 | (2) | +0.10 | 40 | Nil | Nil |
| 2 | Di-2-ethylhexyl-2,3-NDC | 2,900 | 2,250 | 255 | 2.6 | −2.0 | (2) | +0.06 | 38 | Nil | Nil |
| 3 | Diisopentyl-1,6-NDC | 3,000 | 2,510 | 260 | 3.0 | +7.0 | (2) | +0.06 | 43 | Nil | Nil |
| 4 | Di-2-ethylhexyl-1,6-NDC | 2,830 | 2,540 | 300 | 2.3 | −2.0 | (2) | +0.03 | 40 | Nil | Nil |
| 5 | Diisopentyl-mixed NDC | 2,870 | 2,530 | 230 | 4.6 | +7.0 | (2) | +0.05 | 42 | Nil | Nil |
| 6 | Di-2-ethylhexyl mixed NDC | 3,040 | 2,380 | 280 | 1.0 | −2.0 | (2) | +0.04 | 40 | Nil | Nil |
| 7 | Diisobutyl-mixed NDC | 2,770 | 2,405 | 265 | 4.0 | +13 | +0.1 | −0.02 | 53 | Nil | Nil |
| 8 | Diisobutyl-2,3-NDC | 2,815 | 2,435 | 265 | 3.4 | +15 | +0.1 | −0.03 | 53 | Nil | Nil |
| 9 | Diisobutyl-1,6-NDC | 2,825 | 2,425 | 270 | 1.85 | +15 | +0.3 | −0.01 | 55 | Nil | Nil |

[1] NDC—Naphthalenedicarboxylate.
[2] No change.

In the table above the "mixed naphthalene-dicarboxylates" of samples 5, 6 and 7 were derived from petroleum in accordance with the procedure given above. From the table it is clear that the esters of the mixed dicarboxynaphthalenes are effective and superior to the esters of the individual isomeric compounds. All the ester compounds have superior properties to the known commercial plasticizers. Since plasticizers are used in large volumes, the economic advantage of the use of the mixed naphthalenic compositions is apparent. The separation of the individual isomeric forms is involved and is an expensive process. The present invention eliminates the need of such separation and produces a superior plasticizer.

While the invention has been illustrated with specific examples, there is no intent to limit the spirit or scope of the invention to the precise details except as defined in the following.

We claim:

1. A plasticizer composition consisting of alkyl di-esters of a mixture of isomeric dicarboxynaphthalenes having only carboxyl substituents on the naphthalene ring, in which the alkyl substituents have between 1 and 18 carbon atoms.

2. A plasticizer composition for polyvinyl chloride consisting of alkyl di-esters of a mixture of dicarboxynaphthalenes having only carboxyl substituents on the naphthalene ring and derived from a mixture of dimethylnaphthalenes, in which the alkyl substituents contain from 1 to 18 carbon atoms including straight and branched chain groups.

3. A plasticizer composition according to claim 2 in which the dimethylnaphthalenes are derived from a petroleum stream and contain predominantly 1,6-; 2,6-; 1,7-; and 2,3-isomers.

4. A plasticizer composition according to claim 2 in which the dimethylnaphthalenes are derived from a catalytic cycle oil.

5. A composition composed of a major portion of a polyvinyl chloride resin and a plasticizer therefor, said plasticizer comprising alkyl di-esters of a mixture of isomeric dicarboxynaphthalenes having only carboxyl substituents on the naphthalene ring and in which the alkyl substituent contains from 1 to 18 carbon atoms.

6. A composition according to claim 5 wherein the alkyl substituents include straight and branched chain alkyl groups.

7. As a plasticizer composition, the diisopentyl esters of mixed dicarboxynaphthalenes having only carboxyl substituents on the naphthalene ring.

8. As a plasticizer composition, the di-2-ethylhexyl esters of mixed dicarboxynaphthalenes having only carboxyl substituents on the naphthalene ring.

9. As a plasticizer composition, the diisobutyl esters of mixed dicarboxynaphthalenes having only carboxyl substituents on the naphthalene ring.

References Cited by the Examiner
UNITED STATES PATENTS

| | | | |
|---|---|---|---|
| 2,119,993 | 6/1938 | Kyrides | 260—475 |
| 2,748,159 | 5/1956 | Finelli | 260—475 |
| 2,766,272 | 10/1956 | Hetzel | 260—475 |
| 3,097,231 | 7/1963 | Mills et al. | 260—475 |

OTHER REFERENCES

Sachanen: "Conversion of Petroleum," Rheinhold Publishing Co., 1948, page 560.

MORRIS LIEBMAN, *Primary Examiner.*